Figure 1:
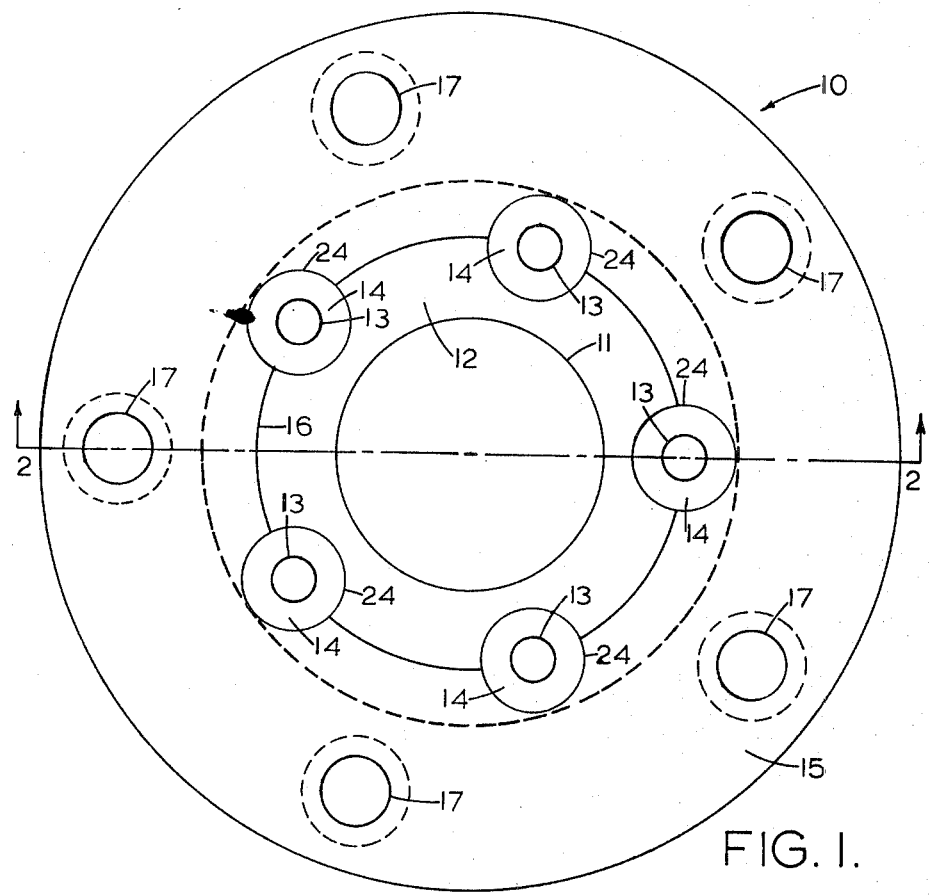

United States Patent [19]

Thousand

[11] 3,834,766

[45] Sept. 10, 1974

[54] WHEEL ADAPTER

[75] Inventor: John L. Thousand, Newport Beach, Calif.

[73] Assignee: Revcon, Incorporated, Fountain Valley, Calif.

[22] Filed: Oct. 5, 1972

[21] Appl. No.: 295,290

[52] U.S. Cl............................. 301/9 DN, 301/9 AN
[51] Int. Cl............................................... B60b 3/14
[58] Field of Search.... 301/9 DN, 9 TV, 9 R, 9 AH, 301/9 AN, 36 R

[56] References Cited
UNITED STATES PATENTS

| | | | |
|---|---|---|---|
| 1,365,896 | 1/1921 | Duffy | 301/9 DN |
| 2,570,559 | 10/1951 | Juergenson | 301/9 DN |
| 2,779,630 | 1/1957 | Klinker | 301/9 DN |
| 3,025,109 | 3/1962 | Martin | 301/9 DN |

*Primary Examiner*—Robert S. Ward, Jr.
*Assistant Examiner*—Reinhard J. Eisenzopf
*Attorney, Agent, or Firm*—Warren H. Kintzinger

[57] ABSTRACT

A wheel adapter mounting high weight capacity truck wheels and tires on automotive hubs and spindles. The adapter mounts on a standard automobile five stud hub with studs on a 5 inch diameter circle. Clamping force of the five studs with wheel bolts tightened to a predetermined relatively high uniform torque at the factory secures the adapter to the hub making possible utilization of a conventional truck wheel with five studs on an 8 inch bolt circle for maximum load carrying capacity. The wheel hub bolts on the 5 inch circle studs are so tightened that torque loads due to braking and acceleration are transmitted between the wheel and hub by friction rather than any material shear load on the hub bolts. The wheel adapter is installed with a center opening light press fit on a wheel hub and radial loads transmitted directly to the hub with the bolt pattern not required to assume any additional loading.

4 Claims, 4 Drawing Figures

PATENTED SEP 10 1974  3,834,766

WHEEL ADAPTER

This invention relates in general to vehicle wheel axle mounting, and in particular, to a wheel adapter for mounting a high weight capacity truck wheel and tire on passenger car size hubs and spindles.

It has become desirable to use passenger car design drive systems terminating in drive hubs at driven wheels and with automotive design wheel spindles on dead non-driven axles in heavier vehicles than passenger cars they have been designed for. An example of such heavier vehicle usage is a motor home where standard automotive parts components may be adapted advantageously to a much higher use. Here it becomes quite advantageous to utilize a front wheel drive mechanism designed basically for a passenger car in a motor home application. For such motor home application it is necessary to have wheels with a load carrying capacity as high as 3,250 pounds. It is, however, not possible in conventional automotive practice to design and build a wheel with that capacity that mounts on a five stud hub with a 5 inch stud nut circle. Current technology limits the maximum capacity of such a wheel to approximately 1,640 pounds. Further, with torque loads due to braking and acceleration it is important that these torque forces be transmitted between the wheel and the wheel hub other than by shear load on hub bolts. Such shear load induces bending in the bolts generating high stresses as well as setting the stage for fatigue failures. Wheels are also subject to radial loads that could also contribute to undesired bolt shear not conducive to safety standards desired.

It is, therefore, a principal object of this invention to provide for mounting conventional truck wheels on passenger car designed axles.

Another object is to provide an adapter for mounting wheels with a larger bolt circle on a hub with smaller diameter stud circle.

A further object is to minimize shear load forces from wheel bolts and studs from whatever forces such as torque loads due to braking and acceleration and/or radial loading.

Another object is for torque loads between a wheel hub or spindle and the wheel to be transmitted primarily by friction with clamping force generated by the lug nuts being torqued to the proper level.

Still another object is to attain transfer of wheel radial forces directly to the wheel hub.

Features of this invention useful in accomplishing the above objectives include, in a wheel mounting adapter, two bolt or stud circles of different diameters with stud nuts on the smaller bolt circle tightened to a predetermined relatively high uniform torque at the factory. Wheel mounting bolts are used extending through bolt holes on the larger bolt circle and through wheel bolt holes of a larger heavier load carrying capacity wheel than the wheel hub or spindle mounting the wheel adapter. The wheel mounting adapter has a center opening sized to be a light press fit on a wheel hub outer end with radial loads transmitted directly to the hub instead of to the bolt pattern of the smaller stud circle.

A specific embodiment representing what is presently regarded as the best mode of carrying out the invention is illustrated in the accompanying drawing.

Figure 2:
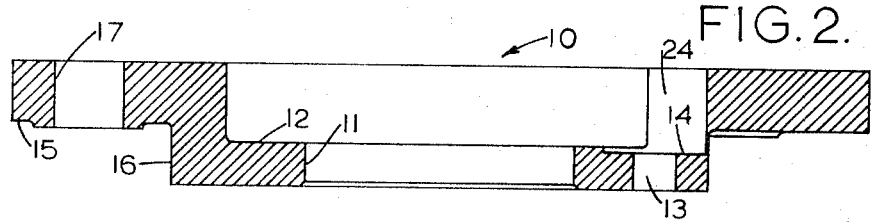
Figure 4:
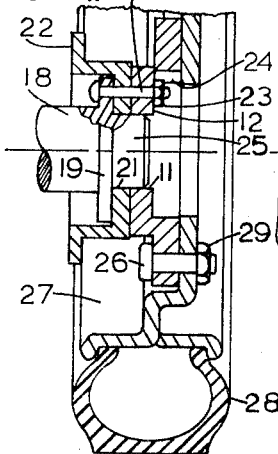
Figure 3:
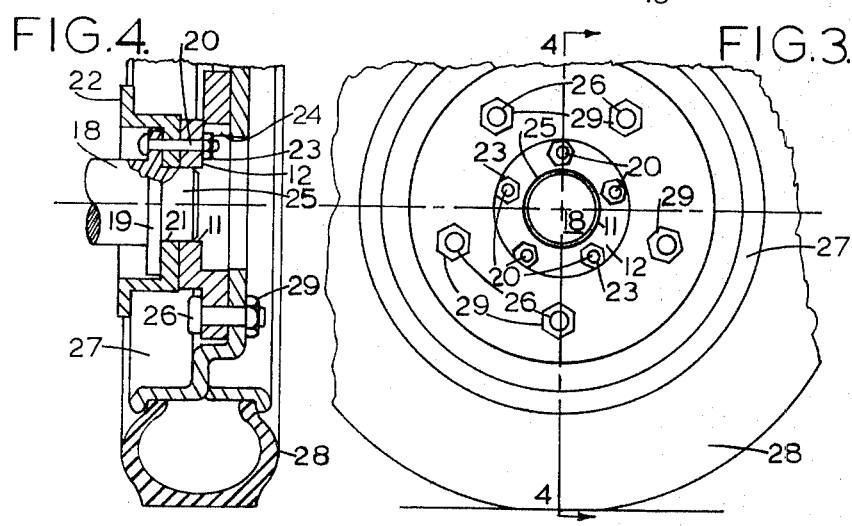

In the drawing:

FIG. 1 represents an outer face elevation view of the wheel mounting adapter;

FIG. 2, a sectioned view of the wheel mounting adapter looking upward along line 2—2 of FIG. 1;

FIG. 3, a partial view of the outer face elevation view of a wheel and tire mounted by the wheel adapter on a wheel hub; and FIG. 4, a partial view of the wheel, tire, wheel adapter, brake and hub assembly primarily in section taken along line 4—4 of FIG. 3.

Referring to the drawing:

Wheel mounting adapter 10 of FIGS. 1 and 2 is shown to have a center opening 11 sized to be a light press fit on wheel hubs the adapter 10 is mounted on. The center opening 11 extends through an inner flange 12 of the adapter having five stud bolt holes 13, with countersunk stud nut surfaces 14 equally spaced on an inner wheel hub stud bolt circle. The wheel adapter 10 is formed with an outer flange 15 that is interconnected to inner flange 12 by a cylindrical shoulder portion 16 mounting the outer flange 15 in outboard parallel spaced relation from inner flange 12. Outer flange 15 has five wheel bolt holes 17 equally spaced on an outer bolt circle that is standard for conventional truck wheel and tire such as, for example, five stud bolts on an 8 inch diameter bolt circle. The five stud inner wheel hub stud bolt circle is a 5 inch diameter circle of a conventional standard passenger car wheel that in passenger car use mounts a standard passenger car wheel. Such hubs and wheels are used with some front wheel drive passenger cars presently being sold. In adapting such a front wheel drive to a motor home application it became apparent that the load carrying capacity of approximately 1,640 pounds with the passenger car wheels just was not adequate to the job. Actually, for the motor home application it was necessary to have wheels with a load carrying capacity as high as 3,250 pounds. Thus, applicant's adapter utilizes a clamping force of the five hub studs to secure the adapter to the hub and also makes possible the utilization of a conventional truck wheel with five studs on an 8 inch diameter bolt circle so that the maximum load carrying capacity required can be attained.

Referring also to FIGS. 3 and 4 the wheel mounting adapter 10 is shown mounted on a wheel hub (or spindle) 18 having a hub stud flange 19 carrying five wheel (or adapter) mounting studs 20 that extend through a radial mounting flange 21 of rotating brake disc 22. Studs 20 (only one of which is shown in FIG. 4 for clarity) extend on through inner flange 12 of the adapter 10 to nuts 23 that are torque stud thread tightened to 120 pounds feet torque. Holes 24 drilled partially through cylindrical shoulder portion 16 provide clearance for the stud nut tool as the stud nuts 23 are torqued down. It should be noted that with the center opening 11 of the adapter a light press fit on wheel hub outer end extension 25 wheel loads are substantially entirely transmitted directly to the hub without the bolt pattern of studs 20 assuming any material radial loading. Wheel mounting bolts 26 on an 8 inch diameter bolt circle mount a standard truck wheel 27 and tire 28 of much greater load carrying capacity than passenger car wheels that otherwise mount directly on the 5 inch diameter stud circle hub 18 with studs 20. The wheel mounting bolt nuts 29 for wheel mounting bolts 26 are conveniently positioned for easy wheel change and mounting while the stud nuts 23 are rarely, if ever disturbed and when removed they must be properly torque tightened whenever a dismounted adapter 10 is reinstalled.

The wheel mounting adapter 10 is being used both on live and dead axles and is particularly useful for the mounting of heavy load carrying capacity truck wheels and tires on the front drive wheels and also on the non-driven dead rear wheels of a front drive motor home. This results in great savings in permitting the utilization of an existing passenger car front drive motor and drive train through use of the adapter to mount wheels of adequate load capacity that otherwise could not be used.

Whereas this invention is here illustrated and described with respect to a specific embodiment thereof, it should be realized that various changes may be made without departing from the essential contributions to the art made by the teachings hereof.

I claim:

1. In a wheel mounting adapter, hub and wheel structure with the adapter for mounting higher weight capacity wheels on hubs than wheels constructed for being mounted directly to the hub structure with hub studs: a radially inward annular flange portion of said wheel mounting adapter with hub stud receiving openings; and a radially outward annular flange portion of said wheel mounting adapter with wheel bolt holding openings; a plurality of hub stud receiving openings equally spaced on a hub stud circle; an equal number of wheel bolt holading openings to the number of hub stud receiving openings equally spaced on a wheel bolt circle of greater diameter than the diameter of said hub stud circle; said radially inward flange portion and said radially outward annular flange portion in axially displaced spaced substantially parallel relation with the radially outward annular flange portion displaced in the outboard direction for stub bolt clearance and ease of wheel mounting; with hub stud nuts tightened to a predetermined relatively high uniform torque wherein the hub stud nuts clamping force is sufficient to transmit torque loads of braking and acceleration between the wheel and the hub by friction between the hub and wheel mounting adapter assembly components; and wheel bolts mounting a wheel to the outboard face of said wheel mounting adapter; and wherein a brake flange is mounted between a hub flange and said wheel mounting adapter.

2. The hub and wheel assembly of claim 1, wherein the hub is a standard passenger car stud hub and the wheel bolts and wheel bolt circle are standard for a conventional truck wheel.

3. The wheel mounting adapter of claim 1, wherein countersunk holes centered on said hub stud receiving openings are provided in said wheel mounting adapter on the outboard side to provide stud nut clearance.

4. The wheel mounting adapter of claim 1, wherein the radially inward annular flange portion of said wheel mounting adapter includes a center opening sized to be a press fit on a hub outer end.

* * * * *